(12) United States Patent
Brunstetter

(10) Patent No.: US 7,315,775 B2
(45) Date of Patent: Jan. 1, 2008

(54) AUTOMOTIVE TRANSMISSION CONTROL SYSTEM AND METHOD

(75) Inventor: Craig A. Brunstetter, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 441 days.

(21) Appl. No.: 11/110,647

(22) Filed: Apr. 20, 2005

(65) Prior Publication Data

US 2006/0241841 A1    Oct. 26, 2006

(51) Int. Cl.
  *G06F 17/00* (2006.01)
  *G06F 7/00* (2006.01)
(52) U.S. Cl. ............................. 701/63; 701/60; 701/34
(58) Field of Classification Search .................. 701/29, 701/33, 34, 51, 60, 63; 477/76, 117
See application file for complete search history.

(56) References Cited

U.S. PATENT DOCUMENTS

| | | | | |
|---|---|---|---|---|
| 5,107,246 A | * | 4/1992 | Mogaki | 340/449 |
| 5,481,906 A | * | 1/1996 | Nagayoshi et al. | 73/116 |
| 5,848,381 A | * | 12/1998 | Ishii et al. | 702/99 |
| 5,995,887 A | * | 11/1999 | Hathaway et al. | 701/34 |
| 7,103,460 B1 | * | 9/2006 | Breed | 701/29 |
| 7,147,366 B2 | * | 12/2006 | Melby et al. | 374/1 |

* cited by examiner

*Primary Examiner*—Yonel Beaulieu

(57) ABSTRACT

The present invention is a control system and method for the determination of a simulated transmission fluid temperature value using multiple linear regression. The present invention also provides a control system and method to diagnose the health of the transmission fluid temperature sensor and provides a default transmission fluid temperature value should failure of the transmission fluid temperature sensor occur.

8 Claims, 4 Drawing Sheets

AUTOMOTIVE TRANSMISSION CONTROL SYSTEM AND METHOD

TECHNICAL FIELD

The present invention is an automotive transmission control system and method of determining the simulated transmission fluid temperature and diagnosing the health of the transmission fluid temperature sensor.

BACKGROUND OF THE INVENTION

The onboard diagnostic systems on modern automobiles are a complex interaction between various computer algorithms and many different sensors. The onboard diagnostics II (OBDII) system has been required on all U.S. vehicles produced since 1996. Although the OBDII system provides a measure of standardization and commonality, the system expanded the scope of monitored components as well a provided specific performance criteria for determining malfunctions. These additional requirements have led to an increase in the amount of onboard sensors and algorithms.

When a sensor failure occurs, it must be comprehended and reported to the operator for remedial action. Various options exist to determine the health of a particular sensor. One option may be to employ a secondary or redundant sensor to rationalize the output of the primary sensor. Yet another option is to fully map the characteristics of the particular sensor under all conditions and populate a look up table (LUT) with these values. This approach is very application specific. A new map may be required for each model of vehicle and, depending on the sensor in question, possibly each engine or transmission variant. To reduce the size of the LUT, engineers and calibrators may limit the range in which the diagnostics will operate. They may employ strict enabling conditions to prevent false failure reporting. These strict enabling conditions may inhibit the diagnostic routine from functioning for a majority of the time.

SUMMARY OF THE INVENTION

The present invention provides a control system and method of determining the simulated transmission fluid temperature and, by comparing this value with the measured transmission fluid temperature, diagnosing the health of the transmission fluid temperature sensor.

The present invention may be used as the diagnostic algorithm for the OBDII P0711 diagnostic trouble code, or DTC. When the P0711 DTC is set, it informs the operator that the transmission fluid temperature sensor circuit has malfunctioned. The present invention provides an algorithm that is capable of monitoring the health of the transmission fluid temperature sensor over a much greater range of operating conditions and vehicle lines than has previously been available.

Accordingly, the present invention provides a transmission control system having a controller operable to determine a simulated transmission fluid temperature value and diagnose the state of health of the transmission fluid temperature sensor. The controller being sufficiently configured and programmed to implement a control loop for performing multiple operations. One of these operations is to calculate a synthetic transmission fluid temperature value. Yet another of these operations is to determine and output a simulated transmission fluid temperature value. Another of these operations is to enable diagnostic testing of a transmission fluid temperature sensor. Additionally, the control loop determines the accuracy of a measured transmission fluid temperature value via a pass/fail algorithm and reports one of a pass condition and a fail condition. Finally the control loop generates a default transmission fluid temperature value should the pass/fail algorithm report said fail condition The synthetic transmission fluid temperature value may be calculated by a plurality of multipliers, each having as inputs the value of one of a plurality of independent variables and their respective calculated multiple linear regression coefficients. Additionally, the synthetic transmission fluid temperature calculator may include at least one summing circuit that inputs the output values of the plurality of multipliers and an intercept value calculated by multiple linear regression, and outputs the synthetic transmission fluid temperature value. The plurality of independent variables may includes at least one of engine run time, total torque converter slip, start up transmission fluid temperature, engine coolant temperature, total engine torque, and engine intake air temperature.

Additionally, the control loop for determining said simulated transmission fluid temperature value may include an IF/THEN/ELSE logic gate having an IF input, a THEN input, and an ELSE input. The IF/THEN/ELSE logic gate, in the preferred embodiment has a start up transmission fluid temperature value as the THEN input and the synthetic transmission fluid temperature value as the ELSE input. A comparator operable to compare an engine run time value with a calibrated delay latch value and output a result to the IF input of the IF/THEN/ELSE logic gate may also be provided. The output of the IF/THEN/ELSE logic gate is the simulated transmission fluid temperature value.

The control loop for enabling testing in the preferred embodiment includes at least one comparator operable to enable diagnostic testing of the transmission fluid temperature sensor if the output of the at least one comparator is true based on the relationship between at least one measured value to at least one calibrated value.

The preferred embodiment of the pass/fail algorithm of the present invention may contain a fail loop that includes a first summing circuit operable to output the difference between the measured transmission fluid temperature value and the simulated transmission fluid temperature value. The fail loop may further include a first comparator operable to compare the absolute value of the difference between the measured transmission fluid temperature value and the simulated transmission fluid temperature value with a calibrated value for the transmission fluid temperature failure delta. Also included may be an AND logic gate and a fail timer, the AND logic gate being operable to input the output from the first comparator and a test enable value, and output an enable signal to the fail timer if both inputs to the AND logic gate are true. A second comparator may be provided that is operable to compare the output value from the fail timer with a calibrated transmission temperature failure time value and output a result. The fail timer may have a timer reset circuit operable to reset the fail timer.

Furthermore, the pass/fail algorithm may include a pass loop having a summing circuit operable to output the difference between the measured transmission fluid temperature value and the simulated transmission fluid temperature value. Also included may be a first comparator operable to compare the absolute value of the difference between the measured transmission fluid temperature value and the simulated transmission fluid temperature value with a calibrated value for the transmission fluid temperature pass delta. The pass loop may also include an AND logic gate and a pass timer, the AND logic gate being operable to input the output from the first comparator, the test enable value, and the inverted result from a fail loop, thereafter the AND logic gate outputs an enable signal to the pass timer if all inputs to the AND logic gate are true. The pass loop may also include a second comparator operable to compare the output value from the pass timer with a calibrated transmission temperature pass time value and output a result and a timer reset circuit operable to reset the pass timer.

The control loop for determining the default transmission fluid temperature value may include an IF/THEN/ELSE logic block operable to output a default transmission fluid temperature value if the pass/fail algorithm reports as failed. The IF/THEN/ELSE logic block has an IF input, a THEN input, an ELSEIF input, a _THEN input, and an _ELSE input, where an inverted value of the fail condition is input to the IF input and the simulated transmission fluid temperature value is input to the THEN and _THEN inputs. Also included may be a first summing circuit operable to output the difference between a start up transmission fluid temperature value and the measured transmission fluid temperature value. Additionally, the transmission fluid temperature default action algorithm may include a comparator operable to compare the absolute value of the difference between the start up transmission fluid temperature value and the measured transmission fluid temperature value with a calibrated start up transmission fluid temperature difference action value and output a result to the ELSEIF input of the IF/THEN/ELSE logic block; and a second summing circuit operable to determine the difference between the engine coolant temperature value and a conditioned engine intake air temperature value and outputting the value to the _ELSE input of the IF/THEN/ELSE logic block.

Another aspect of the present invention includes a method of determining a simulated transmission fluid temperature value. The method includes the recording of values for a plurality of independent variables over a plurality of driving cycles and vehicle configurations and subsequently utilizing multiple linear regression analysis to fit a curve to a dependent variable based upon inputs from the plurality of independent variables thereby determining the respective coefficients for each one of the values of the plurality of independent variables and an intercept value. Each of the plurality of independent variables and their respective coefficients are then multiplied to determine their respective products. The respective products and the intercept value are then summed to generate a synthetic transmission fluid temperature value. The synthetic transmission fluid temperature value may be selected as the simulated transmission fluid temperature value if the engine run time value is greater than a calibrated simulated transmission fluid temperature delay latch value, or alternately, the start up transmission fluid temperature value may be selected as the simulated transmission fluid temperature value if the engine run time is less than or equal to the calibrated simulated transmission fluid temperature delay latch value.

Yet another aspect of the present invention may include a method of diagnosing a transmission fluid temperature sensor failure by enabling diagnostic testing of the transmission fluid temperature sensor. Subsequently, a fail timer, operable to output a time to fail test value, will be enabled if the absolute value of the difference between a measured transmission fluid temperature value and a simulated transmission temperature value is greater than or equal to a calibrated transmission fluid temperature failure threshold value. A test failed bit may then be set if the time to fail test value is greater than or equal to a calibrated transmission fluid temperature fail timer value.

Additionally, the method of diagnosing a transmission fluid temperature sensor failure may further include enabling a pass timer, operable to output a time to pass test value, if the absolute value of the difference between the measured transmission fluid temperature value and the simulated transmission temperature value is greater than or equal to a calibrated transmission fluid temperature pass threshold value and the test failed bit has not been set. A test passed bit may be set if the time to pass test value is greater than or equal to a calibrated transmission fluid temperature pass timer value The method of diagnosing a transmission fluid temperature sensor failure may further include outputting an offset of an engine coolant temperature value as a function of an engine inlet air temperature value as a default transmission fluid temperature value upon the setting of the test failed bit and if the absolute value of the difference between an engine start-up transmission fluid temperature sensor value and a measured transmission fluid temperature value is greater than a calibrated start-up transmission fluid temperature difference action value. Alternately, the method may include outputting the simulated transmission fluid temperature value as the default transmission fluid temperature value when the test failed bit has not been set or when the absolute value of the difference between the engine start-up transmission fluid temperature sensor value and the measured transmission fluid temperature value is less than the calibrated start-up transmission fluid temperature difference action value.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
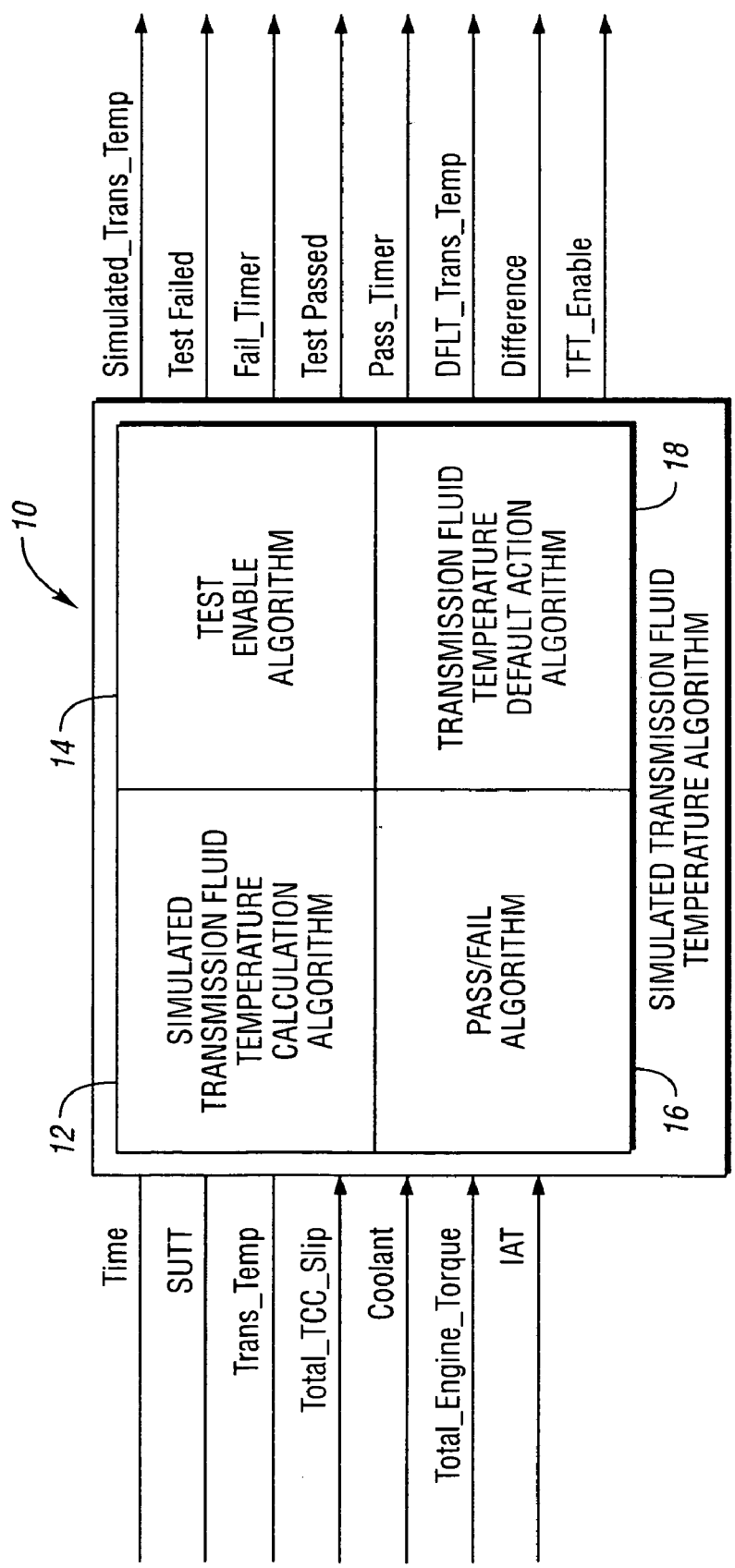
FIG. 1 is a schematic high level overview of the simulated transmission fluid temperature algorithm illustrating the various inputs and outputs and component algorithms of the present invention.

FIG. 1 is a high level overview of the simulated transmission fluid temperature algorithm contained within controller 10 that is the object of the present invention. The simulated transmission fluid temperature algorithm in the preferred embodiment has engine run time or Time (sec), transmission fluid temperature at start-up or SUTT (° C.), total torque converter slip or Total_TCC_Slip (Revolutions), engine coolant temperature or Coolant (° C.), total engine torque or Total_Engine_Torque (N*m*sec), and engine intake air temperature or IAT (° C.) as inputs. Numerical integration may be employed to determine the total torque converter slip as well as the total engine torque. The equations for which are shown below.

$$\text{Total\_TCC\_Slip}_n = \text{Total\_TCC\_Slip}_{n-1} + \frac{1}{60}\text{TCC\_Slip}_{n-1} * dt$$

$$\text{Total\_Engine\_Torque}_n = \text{Total\_Engine\_Torque}_{n-1} + \text{Engine\_Torque}_{n-1} * dt$$

The outputs of the simulated transmission fluid temperature algorithm are simulated transmission fluid temperature or Simulated_Trans_Temp (° C.), indication when a sensor fails or TestFailed, time to fail test or Fail_Timer (sec), indication when a sensor passes or TestPassed, time to pass test or Pass_Timer (sec), default transmission fluid temperature if test has failed or Dft_Trans_Temp (° C.), absolute value of the difference between the simulated transmission fluid temperature and the measured transmission fluid temperature or Difference (° C.), and the test enabling condition or TFT_Enable.

The simulated transmission fluid temperature algorithm consists of four parts in the preferred embodiment: the simulated transmission fluid temperature calculation algorithm 12, the test enable algorithm 14, the pass/fail algorithm 16, and the transmission fluid temperature default action algorithm 18. The simulated transmission fluid temperature calculation algorithm 12, is the logic circuit that calculates and outputs a value for the simulated transmission fluid temperature. The remaining three algorithms form a strategy to diagnose a failed transmission fluid temperature sensor based upon a comparison of the simulated transmission fluid temperature value with that of the measured transmission fluid temperature value and, upon failure, set the P0711 DTC.

Figure 2:
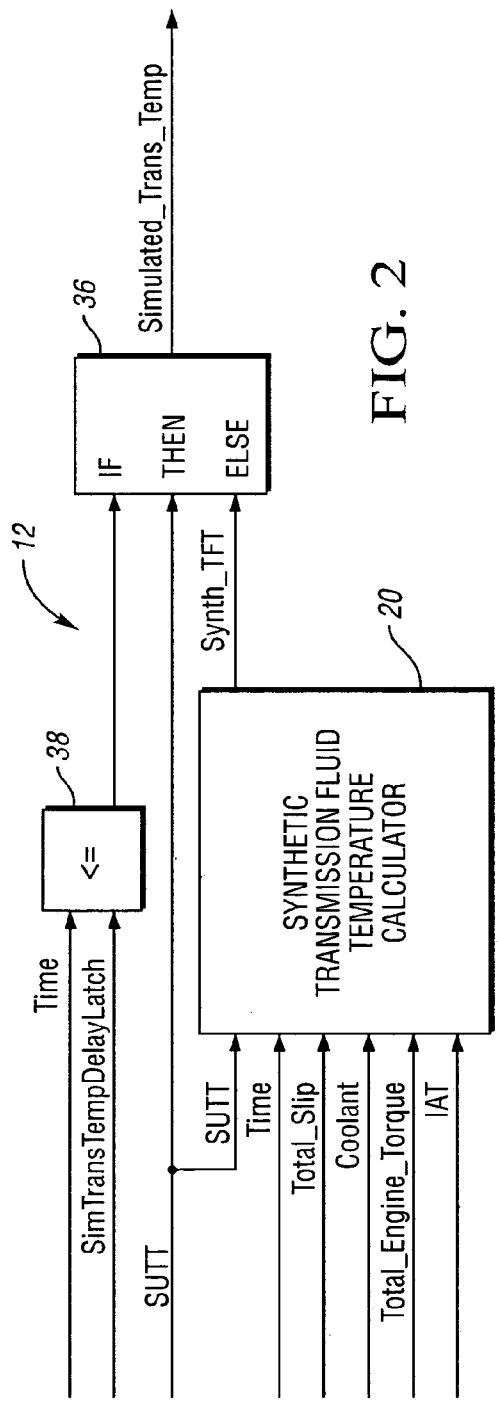
FIG. 2 is a schematic flowchart illustrating the elements of the simulated transmission fluid temperature calculation algorithm.

FIG. 2 is a schematic flowchart illustrating the elements of the simulated transmission fluid temperature calculation algorithm 12. This algorithm outputs a simulated transmission fluid temperature value. A preferred element of the simulated transmission fluid temperature calculation algorithm 12 is the synthetic transmission fluid temperature calculator 20. The synthetic transmission fluid temperature calculator 20 employs a multiple linear regression analysis to acquire the necessary transfer function used in the calculation. Several real-time data sets were collected from vehicles of differing configurations as well as differing drive schedules. The driving schedules included; an extremely cold low speed cycle, a hot cycle towing a load up a grade, a highway cycle under mild ambient conditions, a city drive cycle under ambient conditions, and a drive cycle that allowed the transmission fluid temperature to reach 110° C. and subsequently cool to 80° C.

Multiple linear regression attempts to fit a curve to the dependant variable based on input from the independent variables. Synthetic transmission fluid temperature was chosen as the dependent variable for the present analysis. The independent variables that were significant to the calculation were determined by step-wise regression. The six independent variable chosen for the present analysis were engine run time or Time (sec), transmission fluid temperature at start-up or SUTT (° C.), total torque converter slip or Total_TCC_Slip (Revolutions), engine coolant temperature or Coolant (° C.), total engine torque or Total_Engine_Torque (N*m*sec), and engine intake air temperature or IAT (° C.).

The multiple linear regression analysis defined the coefficients for each of the aforementioned independent variables as well as an intercept value. A careful analysis of the results of the multiple linear regression was required to insure that each of the chosen independent variables is statistically significant and to ensure that a significant amount of the variation was accounted for.

Figure 3:
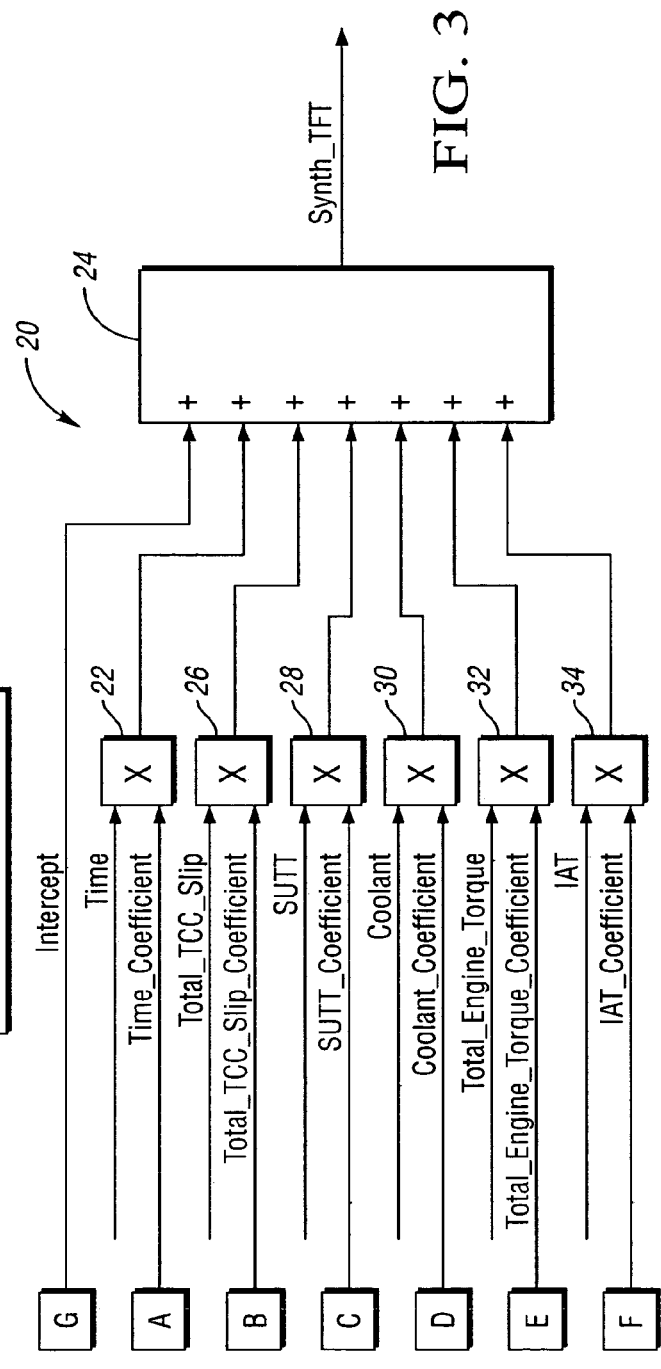
FIG. 3 is a schematic flowchart illustrating the elements of the synthetic transmission temperature calculation flowchart.

FIG. 3 is a schematic flowchart illustrating the steps of the synthetic transmission fluid temperature calculator 20. Each of the independent variables is multiplied with their respective coefficients, the products of which are subsequently summed with the intercept value. The result of this summation is the synthetic transmission fluid temperature value.

Described in more detail, the first independent variable, Time, is input to a first multiplier 22 along with its respective coefficient, A, as determined through multiple linear regression analysis. The output of the first multiplier 22 is input to the summing circuit 24. The second independent variable, Total_TCC_Slip, is input to a second multiplier 26 along with its respective coefficient, B, as determined through multiple linear regression analysis. The output of the second multiplier 26 is input to the summing circuit 24. The third independent variable, SUTT, is input to a third multiplier 28 along with its respective coefficient, C, as determined through multiple linear regression analysis. The output of the third multiplier 28 is input to the summing circuit 24. The fourth independent variable, Coolant, is input to a fourth multiplier 30 along with its respective coefficient, D, as determined through multiple linear regression analysis. The output of the fourth multiplier 30 is input to the summing circuit 24. The fifth independent variable, Total_Engine_Torque, is input to a fifth multiplier 32 along with its respective coefficient, E, as determined through multiple linear regression analysis. The output of the fifth multiplier 32 is input to the summing circuit 24. The sixth independent variable, IAT, is input to a sixth multiplier 34 along with its respective coefficient, F, as determined through multiple linear regression analysis. The output of the sixth multiplier 34 is input to the summing circuit 24. Finally, the intercept, G, as determined through multiple linear regression analysis is input to the summing circuit 24. The output of the summing circuit 24 is the synthetic transmission fluid temperature value or Synt_TFT (° C.). Those skilled in the art will recognize that variables may be added to, or removed from, the list six independent variables listed above while remaining within the scope of the present invention.

Referring again to FIG. 2, the inputs to a comparator 38 are engine run time and a calibrated value for the simulated transmission fluid temperature delay latch or SimTransTempDelayLatch. The output of the comparator 38 is input to the IF input of an IF/THEN/ELSE logic block 36. The start-up transmission fluid temperature is input to the THEN input of the IF/THEN/ELSE logic block 36. The value for Synth_TFT is then input to the ELSE input of the IF/THEN/ELSE logic block 36.

The simulated transmission fluid temperature calculation algorithm 12 runs as follows. If the engine run time is less than or equal to the calibrated value for the simulated transmission fluid temperature delay latch, the output of the comparator 38 will be true, which will enable the THEN command of the IF/THEN/ELSE logic block 36. Thereby allowing the start-up transmission fluid temperature value to be output from the IF/THEN/ELSE logic block 36 as the simulated transmission fluid temperature value. In the alternative, if the engine run time is greater than the calibrated value for the simulated transmission fluid temperature delay latch, the output of the comparator 38 will be false, which will enable the ELSE command of the IF/THEN/ELSE logic block 36. Thereby allowing the synthetic transmission fluid temperature value to be output from the IF/THEN/ELSE logic block 36 as the simulated transmission fluid temperature value.

Figure 4:
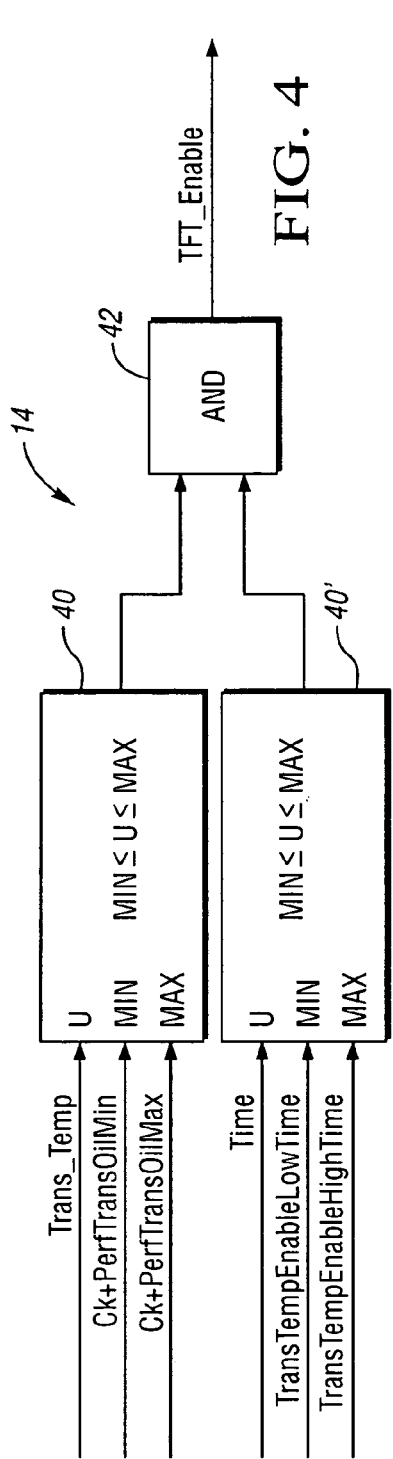
FIG. 4 is a schematic flowchart illustrating the elements of the test enable algorithm.

FIG. 4 is a schematic flowchart illustrating the steps of the test enable algorithm 14. The test enable algorithm 14 permits the diagnostic testing of the transmission fluid temperature sensor to begin and may contain at least one comparator 40. By comparing at least one measured value to at least one calibrated value, the diagnostic subroutine may be enabled. The present embodiment contains two comparators 40 and 40'. The measured transmission fluid temperature value is input to the comparator 40 and the engine run time value is input to the comparator 40' along with their respective calibrated maximum and minimum bounds. The output of comparator 40 and 40' is input to an AND logic gate 42. If both the measured transmission fluid temperature and the engine run time are within the calibrated bounds, both of the inputs to the AND logic gate 42 will be true, thereby reporting a test enabling condition and enabling the diagnostic testing of the transmission fluid temperature sensor. If either one, or both, of the inputs to the AND logic gate 42 are false, the diagnostic testing will not be enabled. Those skilled in the art will find that there may be more, or fewer, enabling conditions than are presented in the preferred embodiment, and that these alternate embodiments will fall within the scope of the present invention.

Figure 5:
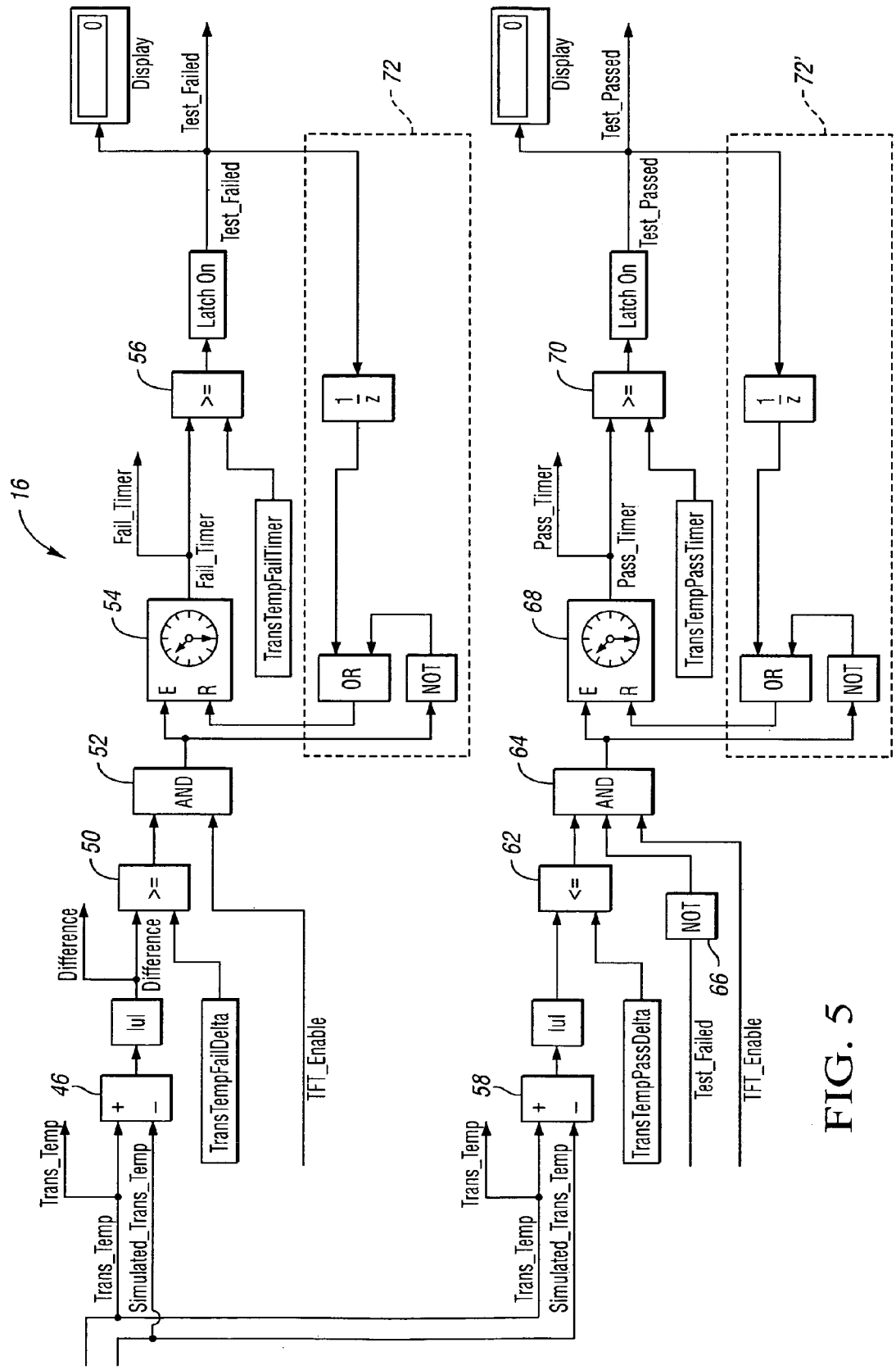
FIG. 5 is a schematic flowchart illustrating the elements of the pass/fail algorithm.

Yet another aspect of the present invention is a pass/fail algorithm 16 as shown in FIG. 5. The pass/fail algorithm 16 determines the health of the transmission fluid temperature sensor. The pass/fail algorithm 16 contains a fail loop and a pass loop. The fail loop has a first summing circuit 46 that inputs the measured transmission fluid temperature value. The simulated transmission fluid temperature is input to an inverting input of first summing circuit 46. The output of first summing circuit 46 is the difference between the measured transmission fluid temperature value and the simulated transmission fluid temperature value. The absolute value of this difference is reported and input to a first comparator 50. Additionally, a calibrated transmission fluid temperature failure threshold value, TransTempFailDelta, is input to the first comparator 50. The output of the first comparator 50 is input to a first AND logic gate 52. A second input to the first AND logic gate 52 is the test enabling condition, TFT_Enable. If the absolute value of the difference is greater than or equal to the calibrated transmission fluid temperature failure threshold value, the output of the first comparator 50 will be true. If the test enabling condition is also true, the first AND logic gate 52 will output true. This in turn will enable a fail timer 54. The fail timer value, Fail_Timer, will be reported and input to a second comparator 56. The second comparator 56 will determine if the fail timer value is greater than or equal to a calibrated transmission fluid temperature fail timer value, TransTempFailTimer, and if true, will set a test failed bit triggering a P0711 DTC. Alternately, if one or both of the inputs to the first AND logic gate 52 is false, the fail timer 54 will not be enabled and no test failed bit will be set.

The pass loop logic is similar to that of the fail loop. The pass loop has a second summing circuit 58 that inputs the measured transmission fluid temperature value. The simulated transmission fluid temperature is input to an inverting input of the second summing circuit 58. The output of the second summing circuit 58 is the difference between the measured transmission fluid temperature and the simulated transmission fluid temperature. The absolute value of this difference is input to a third comparator 62. A calibrated transmission fluid temperature pass threshold value, Trans TempPassDelta, is also input to the third comparator 62. The output of the third comparator 62 is input to a second AND logic gate 64. The second input to the second AND logic gate 64 is the test enabling condition, TFT_Enable. The third input to the second AND logic gate 64 is the inverted value for the indication whether sensor has failed. This inversion is accomplished by the use of a NOT logic gate 66. If the absolute value of the difference is less than or equal to the calibrated transmission fluid temperature pass threshold delta value, TransTempPassDelta, the output of the third comparator 62 will be true. If the test enabling condition is also true, and the test has not reported as failed, the second AND logic gate 64 will output true. This in turn will enable a pass timer 68. The pass timer value, Pass_Timer, will be reported and input to a fourth comparator 70. The fourth comparator 70 will determine if the pass timer value is greater than or equal to a calibrated transmission fluid temperature pass timer value, TransTempPassTimer, and if true, will set a test passed bit. Alternately, if any one, two, or all of the inputs to the second AND logic gate 64 is false, the pass timer 68 will not be enabled.

The timer reset loops 72 and 72' will reset the timers upon the setting of a test fail or test pass bit. The timer reset loops 72 and 72' operate to ensure that accurate fail timer and pass timer values are reported.

Figure 6:
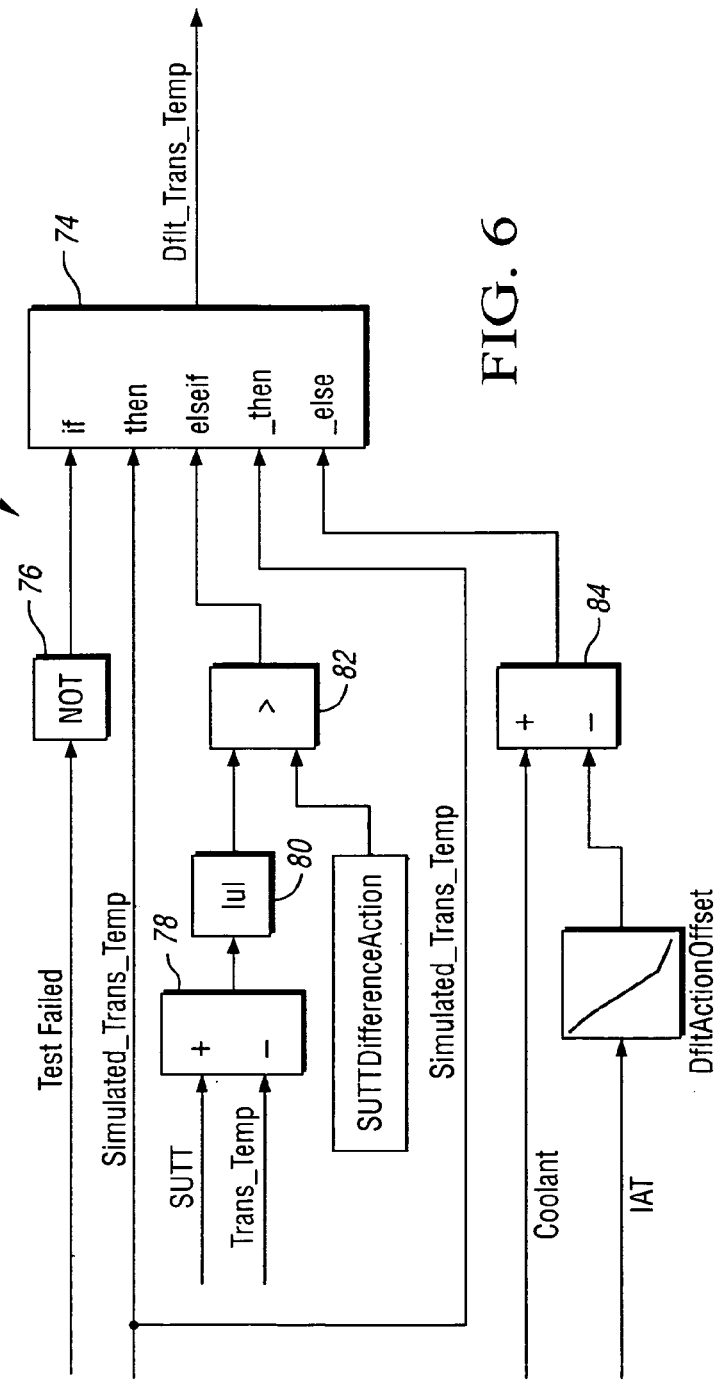
FIG. 6 is a schematic flowchart illustrating the elements of the transmission fluid temperature default action algorithm.

FIG. 6 is a schematic flowchart illustrating the elements of the transmission fluid temperature default action algorithm 18. This is the final component of the diagnostic testing portion of the simulated transmission fluid temperature algorithm. The transmission fluid temperature default action algorithm 18 provides the logic for the determination of the default transmission fluid temperature upon sensor failure and the setting of a P0711 DTC.

The transmission fluid temperature default action algorithm 18 contains an IF/THEN/ELSEIF logic block 74. The IF/THEN/ELSEIF logic block 74 will determine what value to output as the default transmission fluid temperature value, Dflt_Trans_Temp. The input to the IF input of the IF/THEN/ELSEIF logic block 74 is the inverse of the test failed value. This inversion is performed by a NOT logic gate 76. The simulated transmission fluid temperature value is input to both the THEN and the _THEN inputs of the IF/THEN/ELSEIF logic block 74. The measured transmission fluid temperature value is input to an inverting input of a first summing circuit 78. The start-up transmission fluid temperature is also input to the first summing circuit 78. The absolute value of the output of the first summing circuit 78 is input to a comparator 82 where it is compared to the calibrated start-up transmission fluid temperature difference action value, SUTTDifferenceAction. If the absolute value of the difference is greater than the calibrated start-up transmission fluid temperature difference action value, the comparator 82 will output true. Alternately, if the absolute value of the difference is less than this calibrated start-up transmission fluid temperature difference action value, the comparator 82 will output false. The output of the comparator 82 is input to the ELSEIF input of the IF/THEN/ELSEIF logic block 74.

The final input to the IF/THEN/ELSEIF logic block 74 is the output of a second summing circuit 84. The default action offset value, DfltActionOffset, is input to an inverting input of the second summing circuit 84. This value is generated by conditioning the engine's inlet air temperature value with values from a look-up table or LUT in the vehicle's calibration. The second input to the second summing circuit 84 is the engine coolant temperature value, from which, the engine intake air temperature default action offset value is subtracted. The second summing circuit 84 will output an offset value of engine coolant temperature as a function of engine inlet air temperature.

The logic of the transmission fluid temperature default action algorithm 18 is as follows. If the diagnostic testing of the transmission fluid temperature sensor has not reported as failed, the simulated transmission fluid temperature value will be output by the IF/THEN/ELSEIF logic block 74 as the default transmission fluid temperature value, Dflt_Trans_Temp. If the diagnostic testing of the transmission fluid temperature sensor has reported as failed and the absolute value of the difference between the start-up transmission fluid temperature and the measured transmission fluid temperature is greater than a calibrated start-up transmission fluid temperature difference action value, the value for the simulated transmission fluid temperature will be output by the IF/THEN/ELSEIF logic block 74 as the default transmission fluid temperature.

If the diagnostic testing of the transmission fluid temperature sensor has reported as failed and the absolute value of the difference between the start-up transmission fluid temperature and the measured transmission fluid temperature is less than a calibrated value for start-up transmission fluid temperature difference action, the engine coolant offset value will output by the IF/THEN/ELSEIF logic block 74 as the default transmission fluid temperature value. This logic is required in the event that the start-up transmission temperature value fails to change, it will be assumed that the start-up transmission temperature is not accurate. This inaccuracy, if not addressed, may skew the calculated value for the simulated transmission fluid temperature.

While the best modes for carrying out the invention have been described in detail, those familiar with the art to which this invention relates will recognize various alternative designs and embodiments for practicing the invention within the scope of the appended claims.

The invention claimed is:

1. A transmission control system comprising a controller operable to determine a simulated transmission fluid temperature value and diagnose the state of health of a transmission fluid temperature sensor, said controller being sufficiently configured and programmed to implement a control loop for performing the following operations:
   calculating a synthetic transmission fluid temperature value;
   determining and outputting a simulated transmission fluid temperature value;
   enabling diagnostic testing of a transmission fluid temperature sensor;
   determining the accuracy of a measured transmission fluid temperature value via a pass/fail algorithm and reporting one of a pass condition and a fail condition; and
   generating a default transmission fluid temperature value if said pass/fail algorithm reports said fail condition.

2. The transmission control system of claim 1 wherein said synthetic transmission fluid temperature value is calculated by:
   a plurality of multipliers, each having as inputs the value of one of a plurality of independent variables and their respective calculated multiple linear regression coefficients; and
   at least one summing circuit that inputs the output values of said plurality of multipliers and an intercept value calculated by multiple linear regression, and outputs said synthetic transmission fluid temperature value.

3. The transmission control system of claim 2 wherein said plurality of independent variables includes: at least one of engine run time, total torque converter slip, start up transmission fluid temperature, engine coolant temperature, total engine torque, and engine intake air temperature.

4. The transmission control system of claim 2 wherein said control loop for determining said simulated transmission fluid temperature value includes the following elements:
   an IF/THEN/ELSE logic gate having an IF input, a THEN input, and an ELSE input, said IF/THEN/ELSE logic gate having a start up transmission fluid temperature value as said THEN input and said synthetic transmission fluid temperature value as said ELSE input, the output of said IF/THEN/ELSE logic gate is said simulated transmission fluid temperature value; and
   a comparator operable to compare an engine run time value with a calibrated delay latch value and output a result to said IF input of said IF/THEN/ELSE logic gate.

5. The transmission control system of claim 1 wherein said control loop for enabling testing includes the following elements:
   at least one comparator operable to enable diagnostic testing of said transmission fluid temperature sensor if the output of said at least one comparator is true based on the relationship between at least one measured value to at least one calibrated value.

6. The transmission control system of claim 1 wherein said pass/fail algorithm has a fail loop that is implemented by:
   a first summing circuit operable to output the difference between said measured transmission fluid temperature value and said simulated transmission fluid temperature value;
   a first comparator operable to compare the absolute value of the difference between said measured transmission fluid temperature value and said simulated transmission fluid temperature value with a calibrated value for the transmission fluid temperature failure delta;
   an AND logic gate and a fail timer, said AND logic gate being operable to input the output from said first comparator and a test enable value, and output an enable signal to said fail timer if both inputs to said AND logic gate are true;
   a second comparator operable to compare the output value from said fail timer with a calibrated transmission temperature failure time value and output a result; and
   a timer reset circuit operable to reset said fail timer.

7. The transmission control system of claim 1, wherein said pass/fail algorithm has a pass loop that is implemented by:
   a summing circuit operable to output the difference between said measured transmission fluid temperature value and said simulated transmission fluid temperature value;
   a first comparator operable to compare the absolute value of the difference between said measured transmission fluid temperature value and said simulated transmission fluid temperature value with a calibrated value for the transmission fluid temperature pass delta;
   an AND logic gate and a pass timer, said AND logic gate being operable to input the output from said first comparator, the test enable value, and the inverted value of said fail condition, said AND logic gate outputs an enable signal to said pass timer if all inputs to said AND logic gate are true;

a second comparator operable to compare the output value from said pass timer with a calibrated transmission temperature pass time value and output a result; and a timer reset circuit operable to reset said pass timer.

8. The transmission control system claim 1 wherein said control loop for determining said default transmission fluid temperature value includes the following elements:

an IF/THEN/ELSEIF logic block operable to output a default transmission fluid temperature value if said pass/fail algorithm reports as failed, said IF/THEN/ELSE logic block having an IF input, a THEN input, an ELSEIF input, a _THEN input, and an _ELSE input, where an inverted value for said fail condition is input to said IF input and the simulated transmission fluid temperature value is input to said THEN and said _THEN inputs;

a first summing circuit operable to output the difference between a start up transmission fluid temperature value and said measured transmission fluid temperature value;

a comparator operable to compare the absolute value of the difference between said start up transmission fluid temperature value and said measured transmission fluid temperature value with a calibrated start up transmission fluid temperature difference action value and outputting a result to said ELSEIF input of said IF/THEN/ELSE logic block; and a second summing circuit operable to determine the difference between the engine coolant temperature value and a conditioned engine intake air temperature value and outputting the value to said _ELSE input of the IF/THEN/ELSE logic block.

* * * * *